US010008204B2

(12) United States Patent
Kobayashi et al.

(10) Patent No.: US 10,008,204 B2
(45) Date of Patent: Jun. 26, 2018

(54) INFORMATION PROCESSING SYSTEM, AND VEHICLE-MOUNTED DEVICE

(71) Applicant: CLARION CO., LTD., Saitama (JP)

(72) Inventors: Haruki Kobayashi, Saitama (JP); Hiroshige Furugori, Saitama (JP); Masashi Koga, Saitama (JP); Masashi Akachi, Saitama (JP)

(73) Assignee: CLARION CO., LTD., Saitama-Shi, Saitama (JP)

( * ) Notice: Subject to any disclaimer, the term of this patent is extended or adjusted under 35 U.S.C. 154(b) by 0 days. days.

(21) Appl. No.: 15/311,920

(22) PCT Filed: Feb. 25, 2015

(86) PCT No.: PCT/JP2015/055346
§ 371 (c)(1),
(2) Date: Nov. 17, 2016

(87) PCT Pub. No.: WO2016/002251
PCT Pub. Date: Jan. 7, 2016

(65) Prior Publication Data
US 2017/0103756 A1    Apr. 13, 2017

(30) Foreign Application Priority Data

Jun. 30, 2014    (JP) .................................. 2014-133997

(51) Int. Cl.
*G10L 15/18*    (2013.01)
*G10L 15/08*    (2006.01)
(Continued)

(52) U.S. Cl.
CPC .......... *G10L 15/22* (2013.01); *G06F 3/04842* (2013.01); *G10L 15/30* (2013.01);
(Continued)

(58) Field of Classification Search
CPC ......... G10L 15/18; G10L 15/08; G06F 17/24; G06F 3/16
(Continued)

(56) References Cited

U.S. PATENT DOCUMENTS

2003/0117365 A1* 6/2003 Shteyn .................. G06F 3/0481
345/156
2005/0267761 A1* 12/2005 Ueno .................... H04M 1/271
704/277

(Continued)

FOREIGN PATENT DOCUMENTS

EP            1603291 A2    12/2005
JP       2005-346252 A     12/2005
(Continued)

OTHER PUBLICATIONS

International Preliminary Report on Patentability issued for corresponding PCT/JP2015/055346.
(Continued)

*Primary Examiner* — Seong Ah A Shin
(74) *Attorney, Agent, or Firm* — IP Business Solutions, LLC

(57) ABSTRACT

This invention can enhance the convenience of a user. An information processing system 1 includes: a vehicle-mounted device 3 which has a sound pickup unit 36 that picks up a speech sound, and a transmitting unit that transmits speech data that is generated based on the speech sound that is picked up to a control server 8; and the control server 8 which has a server storage unit 82 that stores a pictogram correspondence table 82a in which recognition keywords and pictogram IDs indicating a plurality of pictograms that correspond to the recognition keywords are associated, and a server control unit 81 which executes pictogram processing that selects a recognition keyword that corresponds to text representing a speech sound that is
(Continued)

generated by speech recognition based on speech data from among the recognition keywords included in the pictogram correspondence table 82a, and in accordance with a predetermined condition, selects a single pictogram ID from among a plurality of pictogram IDs that are associated with the selected recognition keyword.

6 Claims, 12 Drawing Sheets

(51) Int. Cl.
　　　G06F 17/24　　　(2006.01)
　　　G06F 3/16　　　(2006.01)
　　　G10L 15/22　　　(2006.01)
　　　G10L 15/30　　　(2013.01)
　　　G06F 3/0484　　　(2013.01)
　　　G10L 15/26　　　(2006.01)
(52) U.S. Cl.
　　　CPC ........ *G10L 15/26* (2013.01); *G10L 2015/221* (2013.01); *G10L 2015/228* (2013.01)
(58) Field of Classification Search
　　　USPC ................................. 704/251, 257, 275, 277
　　　See application file for complete search history.

(56) References Cited

U.S. PATENT DOCUMENTS

| | | | | |
|---|---|---|---|---|
| 2009/0055185 | A1* | 2/2009 | Nakade | G10L 15/30 704/257 |
| 2012/0185240 | A1* | 7/2012 | Goller | G10L 15/22 704/201 |
| 2012/0245945 | A1* | 9/2012 | Miyauchi | G10L 15/06 704/275 |
| 2014/0028542 | A1* | 1/2014 | Lovitt | G06F 3/017 345/156 |
| 2014/0066132 | A1* | 3/2014 | Burke | H04L 67/12 455/569.2 |
| 2014/0201613 | A1* | 7/2014 | Della Corte | G06F 17/30719 715/233 |
| 2015/0120300 | A1* | 4/2015 | Maruta | G06F 17/30746 704/251 |
| 2015/0331664 | A1* | 11/2015 | Osawa | G01C 21/3608 704/275 |
| 2016/0335051 | A1* | 11/2016 | Osawa | G10L 15/22 |

FOREIGN PATENT DOCUMENTS

| | | | |
|---|---|---|---|
| JP | 2006-277567 | A | 10/2006 |
| JP | 2007-127896 | A | 5/2007 |
| JP | 2008-269072 | A | 11/2008 |
| JP | 2011-138343 | A | 7/2011 |
| JP | 2011-209914 | A | 10/2011 |
| JP | 2012-8969 | A | 1/2012 |
| JP | 2012-178024 | A | 9/2012 |
| JP | 2013-088477 | A | 5/2013 |

OTHER PUBLICATIONS

Written Opinion of the International Searching Authority issued for corresponding PCT/JP2015/055346.

International Search Report issued for corresponding PCT/JP2015/055346 application.

Extended European Search Report dated by European Patent Office dated Feb. 7, 2018 in the corresponding European patent application No. 15814656.3-1207/3163457.

* cited by examiner

| RECOGNITION KEYWORD | PICTOGRAM ID |
|---|---|
| RYOKAI | stamp1<br>stamp2<br>stamp3<br>stamp4 |
| OK | stamp10<br>stamp11<br>stamp12 |

← RA1

(B)

| RECOGNITION KEYWORD | PICTOGRAM ID | PICTOGRAM EXISTENCE/ NON-EXISTENCE | SELECTION PICTOGRAM |
|---|---|---|---|
| RYOKAI | stamp1<br>stamp2<br>stamp3<br>stamp4 | ○ | — |
| TOKAI | — | × | RYOKAI |
| KYOKAI | — | × | RYOKAI |
| KEIKAI | — | × | RYOKAI |
| SHOKAI | — | × | RYOKAI |
| OK | stamp10<br>stamp11<br>stamp12 | ○ | — |
| KOKKEI | — | × | OK |

FIG.10

| RECOGNITION KEYWORD | PICTOGRAM ID | COMMUNICATION COUNTERPART | USAGE FREQUENCY |
|---|---|---|---|
| RYOKAI | stamp1 | user1 | HIGH |
| RYOKAI | stamp1 | user2 | LOW |
| RYOKAI | stamp1 | user3 | LOW |
| RYOKAI | stamp2 | user1 | LOW |
| RYOKAI | stamp3 | user2 | LOW |
| RYOKAI | stamp4 | user3 | HIGH |
| OK | stamp10 | user1 | HIGH |
| OK | stamp11 | user2 | LOW |
| OK | stamp12 | user3 | LOW | ically
INFORMATION PROCESSING SYSTEM, AND VEHICLE-MOUNTED DEVICE

TECHNICAL FIELD

The present invention relates to an information processing system and a vehicle-mounted device.

BACKGROUND ART

The technology described in Japanese Patent Laid-Open No. 2005-346252 (Patent Literature 1) is available as background art of the present technical field. In the aforementioned gazette it is described that "A first user terminal 201 is connected to a provider server 204 via a communication network, and transmits the main body of an email to the provider server 204 by speech information. The provider server 204 converts the speech information to text information, distinguishes information to be converted into a pictogram among the text information and reconverts the thus-distinguished information into a pictogram. The user of the first user terminal 201 distinguishes a destination from the main body of an email and transmits the email in which a pictogram and text are mixed in the main body to, for example, a second user terminal 202. In a videophone also, speech information is similarly converted into text information or a pictogram to synthesize an image to be displayed."

CITATION LIST

Patent Literature

Patent Literature 1: Japanese Patent Laid-Open No. 2005-346252

SUMMARY OF INVENTION

Technical Problem

In some cases there is a plurality of pictograms which correspond to text that is specified based on an utterance by a user. However, according to the technology disclosed in Patent Literature 1, if text that is specified based on an utterance of a user is the same text, the text will be converted into the same pictogram. Consequently, for example, it is not possible for a user to send pictograms which differ from the usual depending on the user's current mood by email.

Therefore, an object of the present invention is to provide an information processing system and a vehicle-mounted device which enhance the convenience of a user.

Solution to Problem

To achieve the above described object, an information processing system includes an information processing apparatus and a vehicle-mounted device that is mounted in a vehicle, wherein: the vehicle-mounted device includes a sound pickup unit that picks up a speech sound, and a transmitting unit which transmits speech data that is generated based on the speech sound that is picked up by the sound pickup unit to the information processing apparatus; and the information processing apparatus includes a storage unit which stores pictogram correspondence information in which keywords and pictogram information indicating a plurality of pictograms which correspond to the keywords are associated, and a control unit that executes pictogram selection processing which selects the keyword which corresponds to text representing a speech sound that is generated by speech recognition based on the speech data from among the keywords which the pictogram correspondence information includes, and in accordance with a predetermined condition, selects one item of the pictogram information from among a plurality of items of the pictogram information that are associated with the keyword that is selected.

Advantageous Effects of Invention

According to the present invention, the convenience of a user can be enhanced.

BRIEF DESCRIPTION OF DRAWINGS

FIG. 4 is a view illustrating an example of a pictogram correspondence table.

FIG. 10 is a view illustrating a second table.

DESCRIPTION OF EMBODIMENTS

Figure 1:
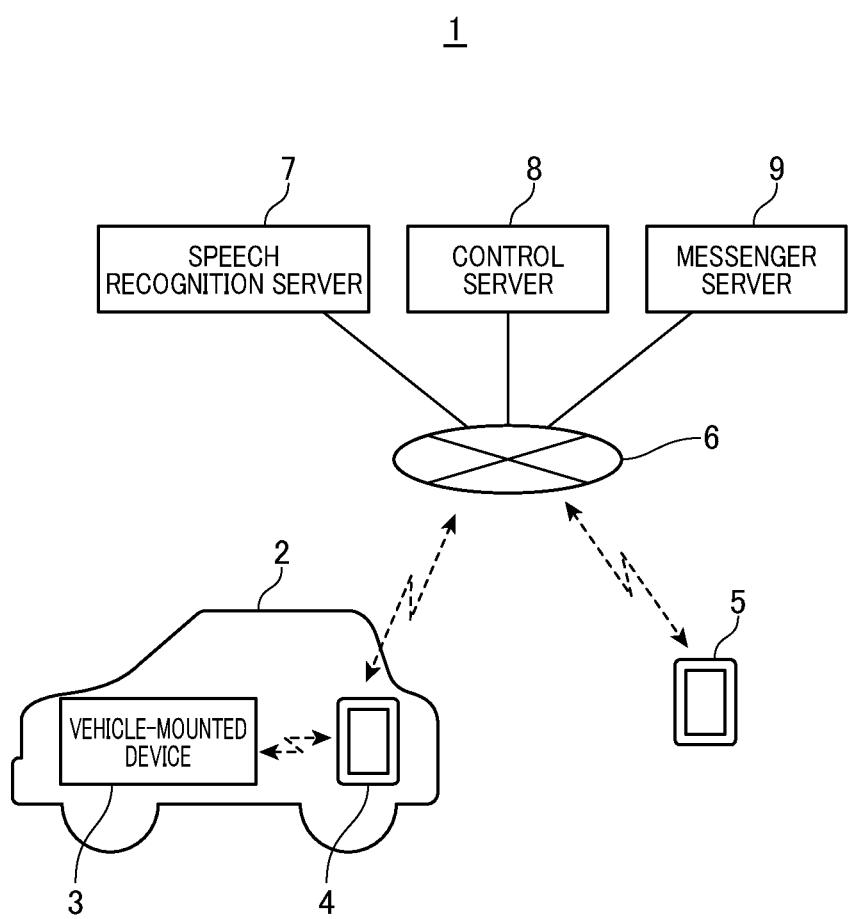
FIG. 1 is a view illustrating the configuration of an information processing system according to an embodiment of the present invention.

FIG. 1 is a view illustrating the configuration of an information processing system 1 according to the present embodiment.

As shown in FIG. 1, the information processing system 1 includes a vehicle-mounted device 3 that is mounted in a vehicle 2, and a control server 8 (information processing apparatus) that is connected to the Internet or a network 6 constituted by including a telephone network or the like.

A speech recognition server 7 is connected to the network 6. As described in further detail later, the speech recognition server 7 is a server that has a function which, in response to a request from the control server 8, generates text that represents a speech sound which is based on speech data of a speech sound that is picked up inside the vehicle 2.

A portable terminal 4 that a user riding in the vehicle 2 possesses is connected by short-range radio communication, such as Bluetooth (registered trademark) communication, to the vehicle-mounted device 3. The portable terminal 4 is connectable to the network 6, and the vehicle-mounted device 3 accesses the network 6 through the portable terminal 4 and communicates with a device, such as the control server 8, that is connected to the network 6.

The portable terminal 4 is a portable-type terminal that the user can carry, and for example is a smartphone or a tablet-type terminal. The portable terminal 4 can perform sending and receiving of messages in a so-called "chat" form to and from a communication-destination portable terminal 5 that is a portable terminal which another person possesses, by utilizing a message sending and receiving system (data sending and receiving system) provided by a messenger server 9 that is connected to the network 6. In the following description, the phrase "send a message from one terminal to another terminal" means that the relevant one terminal utilizes the message sending and receiving system which the messenger server 9 provides and transmits information relating to a message to the other terminal so as to achieve a state in which it is possible to display the message on the other terminal.

Sending and receiving of messages will be now be described in detail. A dedicated application (hereunder, referred to as "dedicated application AP") for utilizing the message sending and receiving system is installed in the portable terminal 4 and the communication-destination portable terminal 5, respectively.

When a user wants to send a message to the communication-destination portable terminal 5, the user activates the dedicated application AP of the portable terminal 4, and utilizes a user interface provided by a function of the dedicated application AP to input a user ID of the communication counterpart to which to send the message to. The term "user ID" refers to identification information that is assigned within the message sending and receiving system to identify respective users. The portable terminal 4 transmits the inputted user ID to the messenger server 9 by means of a function of the dedicated application AP. Based on the user ID that is received, the messenger server 9 identifies the communication-destination portable terminal 5 and establishes a state in which sending and receiving of a message can be performed between the portable terminal 4 and the communication-destination portable terminal 5.

The user inputs a message utilizing the user interface that is provided by a function of the dedicated application AP. The portable terminal 4 transmits data that includes a message to the messenger server 9 by a function of the dedicated application AP, and the messenger server 9 transmits the data to the communication-destination portable terminal 5. The communication-destination portable terminal 5 displays a message on a display panel based on the data received from the messenger server 9.

Further, if the portable terminal 4 receives data including a message from the communication-destination portable terminal 5 through the messenger server 9 by a function of the dedicated application AP, the portable terminal 4 displays a message based on the data. The messages exchanged between the portable terminal 4 and the communication-destination portable terminal 5 are displayed in chronological order on a predetermined screen that is provided by a function of the dedicated application AP, together with information that identifies the user (the information may be a user ID or may be other information such as the name of the user) that is the communication counterpart.

The portable terminal 4 has an operating mode that transmits a pictogram (hereunder, referred to as "pictogram transmission mode") as a message. In the present example, the term "pictogram" means an image that is displayable on display means, and to which a pictogram ID that is described later is assigned. Examples of a pictogram include an image relating to an illustration in which a facial expression of a person is represented, an image relating to an illustration in which a facility such as a hospital or school is represented, and an image obtained by applying some kind of processing to a character or symbol. Further, in the present example, the term "text" means a character or a symbol to which a character code is assigned. When the operating mode is the pictogram transmission mode, the portable terminal 4 transmits a pictogram as a message, or displays a transmitted pictogram on a predetermined screen.

Under the above described configuration, the information processing system 1 according to the present embodiment enables execution of the processing described hereunder. That is, in a case where a user possessing the portable terminal 4 is riding in the vehicle 2 and is driving the vehicle 2, the information processing system 1 makes it possible for the user to send a message to the communication-destination portable terminal 5 by uttering the message, without operating the portable terminal 4. In particular, when the operating mode is the pictogram transmission mode, the information processing system 1 enables the user, without operating the portable terminal 4, to send a pictogram as a message to the communication-destination portable terminal 5 by uttering a speech sound that represents a pictogram. At such time, in a case where there is a plurality of pictograms corresponding to a speech sound that is uttered, the information processing system 1 performs processing that selects the precise single pictogram. Hereunder, the configuration and operations of each apparatus constituting the information processing system 1 are described in detail.

Figure 2:
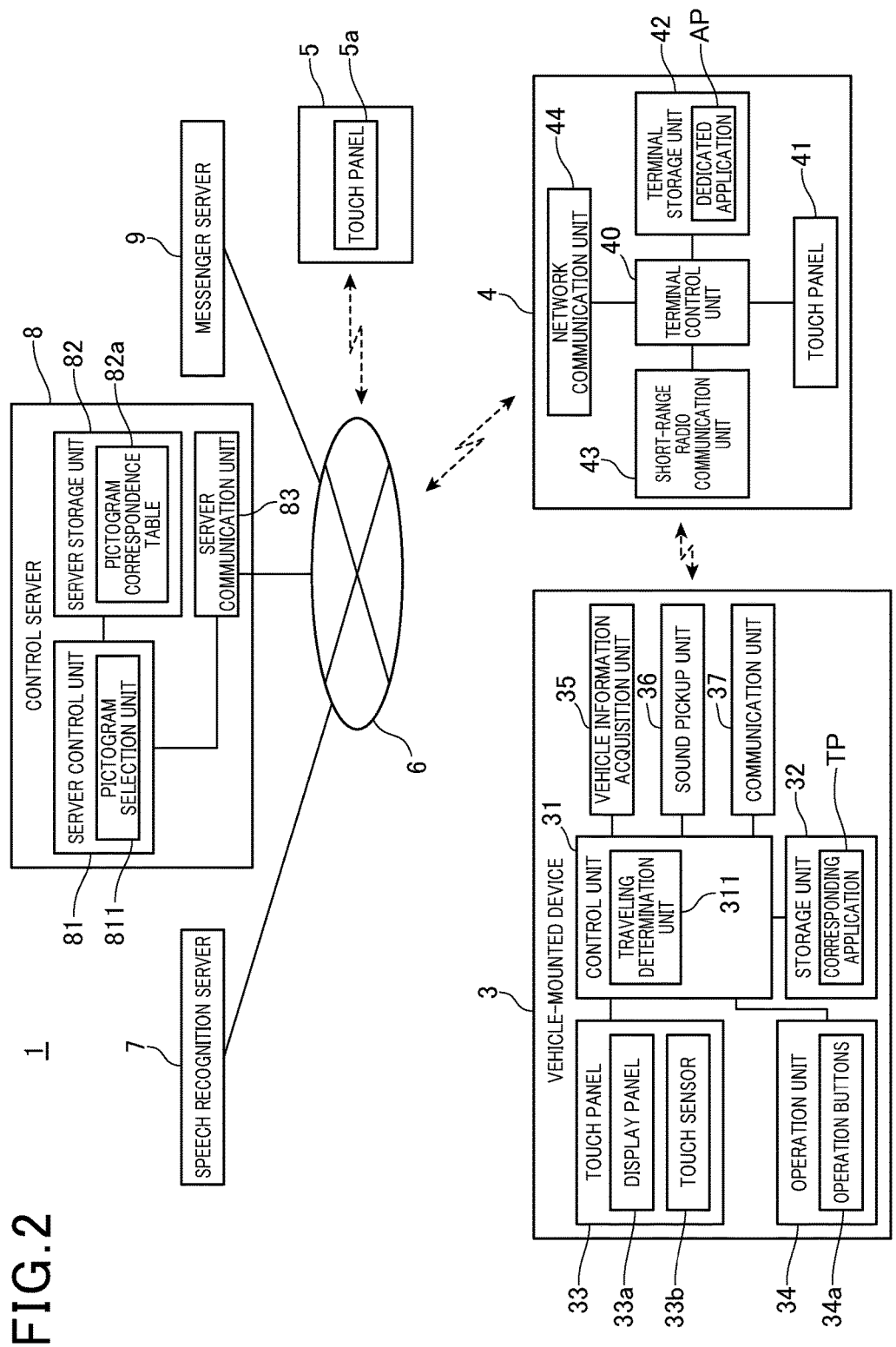
FIG. 2 is a functional block diagram of the information processing system.

FIG. 2 is a functional block diagram of the information processing system 1 according to the present embodiment.

As shown in FIG. 2, the vehicle-mounted device 3 includes a control unit 31, a storage unit 32, a touch panel 33, an operation unit 34, a vehicle information acquisition unit 35, a sound pickup unit 36 and a communication unit 37.

The control unit 31 is equipped with a CPU, a ROM, a RAM and other control circuits and the like, and controls the respective units of the vehicle-mounted device 3. By executing a control program, the control unit 31 functions as a traveling determination unit 311, which is described later.

The storage unit 32 is equipped with a nonvolatile memory such as a hard disk or an EEPROM, and rewritably stores data.

The touch panel 33 includes a display panel 33a and a touch sensor 33b. The display panel 33a has a panel such as a liquid crystal display or an EL (electro luminescent) display, and displays various kinds of information on the display panel 33a under the control of the control unit 31. The touch sensor 33b is disposed in a superimposed manner on the display panel 33a, and detects a touch operation of a user, and outputs a corresponding detection signal to the control unit 31.

The vehicle information acquisition unit 35 acquires vehicle signals relating to the state of the vehicle 2 in which the vehicle-mounted device 3 is mounted, and outputs the acquired vehicle signals to the control unit 31. The vehicle signals include at least a vehicle-speed pulse signal that indicates a traveling speed of the vehicle 2, and a parking brake signal that indicates the state of a parking brake of the vehicle 2. The traveling determination unit 311 of the control unit 31 determines whether or not the vehicle 2 is stopped, based on the vehicle signals that are input from the vehicle information acquisition unit 35. In the present embodiment, the term "stopped" refers to a state in which the vehicle 2 is not traveling and the parking brake is engaged. In such a state, it is possible for the user acting as the driver to perform operations on the touch panel 33.

The sound pickup unit 36 is connected to a microphone, and uses the microphone to pick up speech sounds uttered by the user. The microphone generates speech data based on the speech sounds that are picked up, and outputs the generated speech data to the control unit 31.

Under the control of the control unit 31, the communication unit 37 establishes a communication link with the portable terminal 4 in accordance with a communication standard relating to short-range radio communication such as Bluetooth, and communicates with the portable terminal 4. In the present embodiment, the control unit 31 and the communication unit 37 cooperate to function as a "transmitting unit".

As shown in FIG. 2, the portable terminal 4 includes a terminal control unit 40, a touch panel 41, a terminal storage unit 42, a short-range radio communication unit 43 and a network communication unit 44.

The terminal control unit 40 is equipped with a CPU, a ROM, a RAM and other peripheral circuits and the like, and controls the respective units of the portable terminal 4.

The touch panel 41 displays various information under the control of the terminal control unit 40, and also detects a touch operation by a user and outputs a corresponding detection signal to the terminal control unit 40.

The terminal storage unit 42 is equipped with a nonvolatile memory, and stores various kinds of data. As described above, the dedicated application AP is installed in the portable terminal 4. The dedicated application AP is stored in the terminal storage unit 42

The short-range radio communication unit 43 establishes a communication link with the vehicle-mounted device 3 in accordance with a communication standard relating to predetermined short-range radio communication under control of the terminal control unit 40, and communicates with the vehicle-mounted device 3 in accordance with the communication standard.

The network communication unit 44 communicates with a device that is connected to the network 6 in accordance with a predetermined communication standard, under control of the terminal control unit 40.

As shown in FIG. 2, the control server 8 is equipped with a server control unit 81 (control unit), a server storage unit 82 (storage unit) and a server communication unit 83.

The server control unit 81 is equipped with a CPU, a ROM, a RAM and other peripheral circuits and the like, and controls the respective units of the control server 8. By executing a control program which the server storage unit 82 stores, the server control unit 81 functions as a pictogram selection unit 811. The pictogram selection unit 811 will be described later.

Under the control of the server control unit 81, the server communication unit 83 communicates in accordance with a predetermined communication standard with a device that is connected to the network 6.

The server storage unit 82 stores a control program that the server control unit 81 executes, and data that the server control unit 81 processes. The server control unit 81 stores a pictogram correspondence table 82a (pictogram correspondence information). The pictogram correspondence table 82a will be described later.

As described later, the speech recognition server 7 shown in FIG. 2 is a server that has a function which generates text that represents a speech sound, based on speech data that is generated based on a speech sound that a user uttered.

The messenger server 9 shown in FIG. 2 is a server that has a function which provides the aforementioned message sending and receiving system.

Each of the control server 8, the speech recognition server 7 and the messenger server 9 need not necessarily be a single server apparatus, and may be constituted by a plurality of server apparatuses or may be realized by a function of one part of a predetermined system.

Next, operations of the respective apparatuses will be described with regard to a case where a user in possession of the portable terminal 4 gets into the vehicle 2, and while inside the vehicle 2, the user sends a pictogram as a message to the communication-destination portable terminal 5 by uttering a speech sound representing the pictogram.

Note that, to facilitate understanding of the invention of the present application, FIG. 2 is a schematic drawing in which the functional configuration of each apparatus of the information processing system 1 is illustrated in a manner in which the functional configurations are classified according to the main processing contents, and the functional configurations of the respective apparatus can also be further classified into a greater number of constituent elements.

Furthermore, the functional configurations may be classified so that one constituent element executes a greater amount of processing.

Further, the processing of the respective constituent elements may be executed by a single piece of hardware or may be executed by multiple pieces of hardware.

In addition, the processing of the respective constituent elements may be realized by a single program, or may be realized by a plurality of programs.

Further, the respective functional blocks which the server control unit 81 of the control server 8 is equipped with can be realized by, for example, loading a predetermined program that is stored in the server storage unit 82 to the RAM or the like, and executing the predetermined program using the CPU which the server control unit 81 is equipped with.

Figure 3:
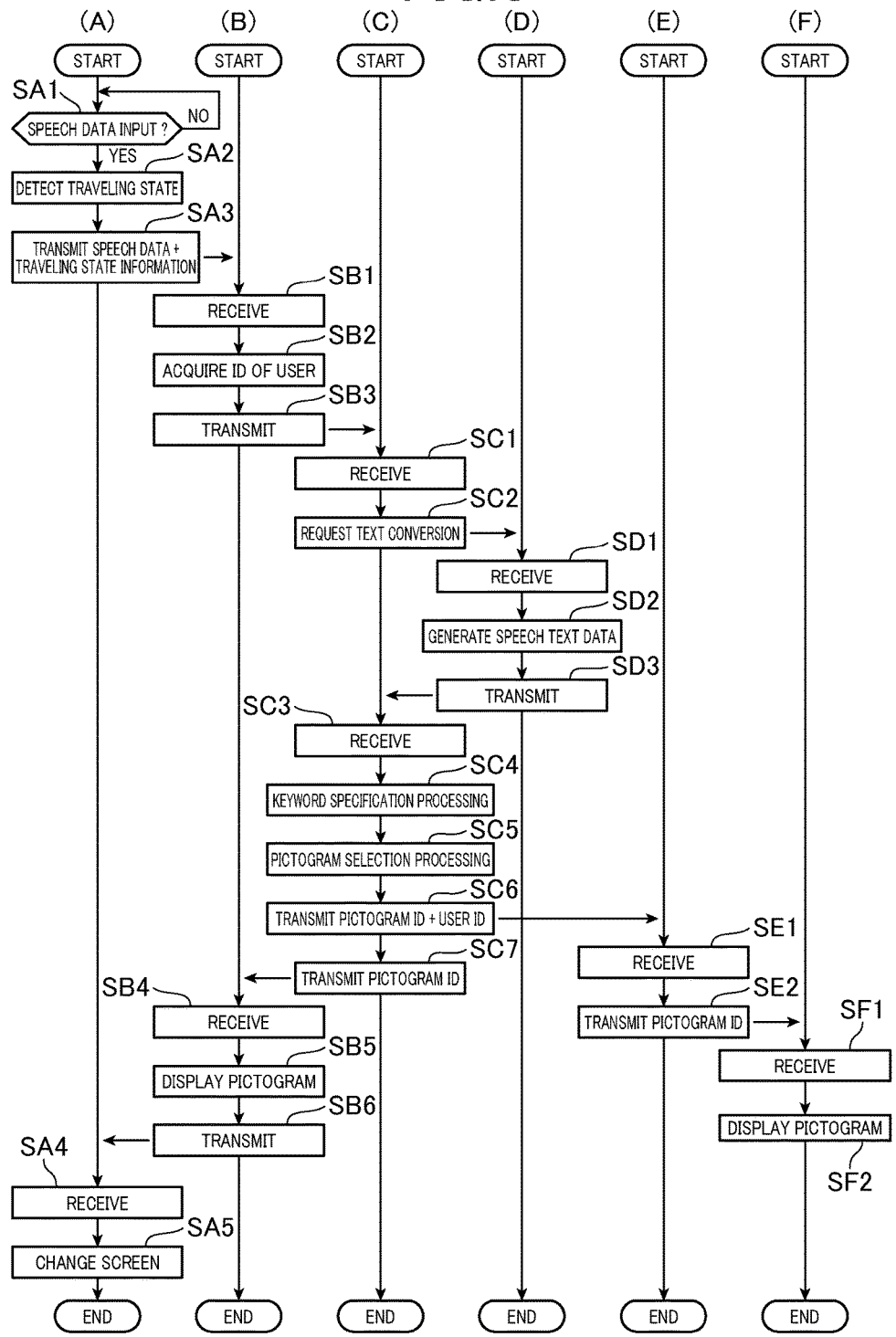
FIG. 3 is a flowchart illustrating operations of respective apparatuses constituting the information processing system.

FIG. 3 is a flowchart illustrating operations of the respective apparatuses constituting the information processing system 1, in which (A) shows operations of the vehicle-mounted device 3, (B) shows operations of the portable terminal 4, (C) shows operations of the control server 8, (D) shows operations of the speech recognition server 7, (E) shows operations of the messenger server and (F) shows operations of the communication-destination portable terminal 5.

An application (hereunder, described as "corresponding application TP") that corresponds to the dedicated application AP installed in the portable terminal 4 is installed in the vehicle-mounted device 3. The corresponding application TP of the vehicle-mounted device 3 communicates with the dedicated application AP of the portable terminal 4, acquires image plotting data of a screen that the dedicated application AP is displaying on the touch panel 41 of the portable terminal 4 and, based on the image plotting data, displays a corresponding image on one part of the touch panel 33 of the vehicle-mounted device 3. By means of the relevant function of the corresponding application TP, a screen that is displayed on the touch panel 41 of the portable terminal 4 by a function of the dedicated application AP and a screen that is displayed on the touch panel 33 of the vehicle-mounted device 3 are synchronized and the screens of the respective apparatuses are brought into correspondence with each other, and furthermore, if there is a change in the screen on the portable terminal 4 side, the screen on the vehicle-mounted device 3 side also changes in correspondence therewith. Accordingly, in a case where, by means of a function of the dedicated application AP, a screen on which messages exchanged with the communication-destination portable terminal 5 are displayed as a list in chronological order is displayed on the touch panel 41 of the portable terminal 4, a corresponding screen is displayed on the touch panel 33 of the vehicle-mounted device 3, and if a new message is added and displayed on the screen on the portable terminal 4 side, the new message is added and displayed in a corresponding manner on the screen on the vehicle-mounted device 3 side.

The following facts are taken as a premise at the time point at which the operations shown in the flowchart in FIG. 3 start.

That is, it is taken as a premise that when the dedicated application AP of the portable terminal 4 is activated, the corresponding application TP of the vehicle-mounted device 3 is activated together therewith. Further, it is taken as a premise that a connection in accordance with a predetermined protocol is established between the dedicated application AP and the corresponding application TP, and a state in which asynchronous sending and receiving of data can be performed between these applications is established. As described above, when activating the dedicated application AP, the user inputs the user ID of the communication counterpart (in the present example, the user ID of the user of the communication-destination portable terminal 5).

Further, it is taken as a premise that the operating mode is the aforementioned pictogram transmission mode.

As shown in FIG. 3(A), by means of a function of the corresponding application TP, the control unit 31 of the vehicle-mounted device 3 monitors whether or not there is an input of speech data from the sound pickup unit 36 (step SA1). As described above, if the user utters a word, a speech sound that is based on the utterance is picked up by the microphone connected to the sound pickup unit 36. The sound pickup unit 36 then generates speech data based on the speech sound that is picked up, and outputs the generated speech data to the control unit 31.

In a case where speech data was input from the sound pickup unit 36 (step SA1: Yes), the control unit 31 determines whether or not the vehicle 2 is stopped based on a determination result obtained by the traveling determination unit 311 (step SA2). As described above, in the present embodiment the term "stopped" refers to a state in which the vehicle 2 is not traveling and the parking brake is engaged. In such a state, it is possible for the user who is acting as the driver to perform operations on the touch panel 33.

Next, by means of a function of the corresponding application TP, the control unit 31 controls the communication unit 37 to transmit traveling state information indicating whether or not the vehicle 2 is in a stopped state as well as the inputted speech data to the portable terminal 4 (step SA3).

As shown in FIG. 3(B), the terminal control unit 40 of the portable terminal 4 controls the short-range radio communication unit 43 to receive the traveling state information and the speech data (step SB1).

Next, by means of a function of the dedicated application AP, the terminal control unit 40 acquires the user ID of the communication counterpart that was input beforehand by the user (step SB2).

Subsequently, by a function of the dedicated application AP, the terminal control unit 40 controls the network communication unit 44 to transmit the traveling state information and the speech data received in step SB1 and the user ID acquired in step SB2 to the control server 8 (step SB3). Note that, the corresponding application TP relating to the vehicle-mounted device 3 manages information that is required in order to communicate with the control server 8, such as an address or the like of the control server 8, and notifies such information to the dedicated application AP in advance. Based on the information that is notified in advance, the dedicated application AP establishes a connection in accordance with a predetermined communication standard with the control server 8, and transmits data to the control server 8 through the connection.

As shown in FIG. 3(C), the server control unit 81 of the control server 8 controls the server communication unit 83 to receive the traveling state information, the speech data and the user ID (step SC1).

Next, the server control unit 81 generates text conversion request data which includes the received speech data and which requests the conversion of a speech sound relating to the speech data to text, and controls the server communication unit 83 to transmit the text conversion request data to the speech recognition server 7 (step SC2). Note that, the server control unit 81 manages information that is required in order to communicate with the speech recognition server 7, establishes a connection according to a predetermined communication standard with the server, and transmits the text conversion request data utilizing the connection.

As shown in FIG. 3(D), the speech recognition server 7 receives the text conversion request data (step SD1).

Next, the speech recognition server 7 converts the speech sound relating to the speech data to text based on the speech data included in the text conversion request data to thereby generate text data (hereunder, referred to as "speech text data") in which text representing a speech sound (hereunder, referred to as "speech text") is described (step SD2).

In this case, when generating the speech text data, the speech recognition server 7 according to the present embodiment performs speech recognition based on the speech data, and based on the result of the speech recognition, generates five candidates as speech text in the order of the highest degree of recognition accuracy (=order of lowest possibility of a recognition error), and describes the five speech text candidates in sequential order in the speech text data. Therefore, in the speech text data, five items of speech texts are described in descending order with respect to the higher degree of speech recognition accuracy.

Note that all pre-existing technologies can be utilized for converting a speech sound relating to the speech data to text, and the conversion may be performed by any method.

Next, the speech recognition server 7 sends the generated speech text data to the control server 8 (step SD3).

Note that, in the present embodiment a configuration is adopted in which conversion from speech data to speech text data is executed by the speech recognition server 7. However, a configuration may also be adopted in which a function that executes the conversion is provided in the control server 8, and the control server 8 executes the conversion independently.

As shown in FIG. 3(C), the server control unit 81 of the control server 8 controls the server communication unit 83 to receive the speech text data (step SC3).

Next, the pictogram selection unit 811 of the server control unit 81 executes keyword specification processing (step SC4). The keyword identification processing is described in detail hereunder.

The keyword specification processing is processing that, based on speech text described in the speech text data, specifies a corresponding recognition keyword (keyword), described later, and specifies a pictogram ID (pictogram information), described later, that corresponds to the recognition keyword that is specified. Hereunder, three methods are exemplified as methods for specifying a recognition keyword in the keyword specification processing.

<First Method for Specifying Recognition Keyword (First Specification Method)>

FIG. 4(A) is a view that illustrates the pictogram correspondence table 82a (hereunder, referred to as "first pictogram correspondence table E1") that is used when specifying a recognition keyword by a first specification method.

As shown in FIG. 4(A), a single record in the first pictogram correspondence table E1 includes a recognition keyword field FA1 in which a recognition keyword is stored, and a pictogram ID field FA2 in which pictogram IDs are stored.

The term "recognition keyword" refers to text that, in a case where a pictogram is represented by a word, shows the relevant word. That is, a recognition keyword is text that represents a pictogram. For example, with respect to a pictogram that imitates the appearance of a school and which is suggestive of a "school" when visually perceived, "school" is set as the recognition keyword. An appropriate single recognition keyword is set in advance for each pictogram.

The term "pictogram ID" refers to identification information that is allocated to each pictogram to identify the pictogram.

A recognition keyword and a pictogram ID that are in a correspondence relation are associated in the respective records of the first pictogram correspondence table E1. In some cases, there is a plurality of pictogram IDs that correspond to a single recognition keyword. This means that when a user utters a speech sound representing a pictogram, in some cases there is a plurality of pictogram candidates that correspond to the speech sound. For example, while the recognition keyword of a first record RA1 in FIG. 4(A) is "RYOKAI" (meaning "understood"), there are four pictogram IDs corresponding to the recognition keyword, namely, "stamp 1", "stamp 2", "stamp 3" and "stamp 4".

The first pictogram correspondence table E1 has the following characteristic in comparison to a second pictogram correspondence table E2 that is described later. That is, a recognition keyword that shows text that reflects an error in speech recognition is not stored in the recognition keyword field FA1 of the first pictogram correspondence table E1. For example, in a case where a pictogram corresponding to "RYOKAI" exists, if the user utters the word "RYOKAI" with the intention of sending the relevant pictogram as a message, there is a possibility that, due to a recognition error, text that is different to "RYOKAI", such as "TOKAI", will be generated as the result of speech recognition. In the first pictogram correspondence table E1, unlike the second pictogram correspondence table E2 that is described later, a recognition keyword that shows text in which a speech recognition error is reflected, such as "TOKAI", is not stored in the recognition keyword field FA1. That is, the recognition keywords stored in the recognition keyword field FA1 are only recognition keywords that represent respective pictograms.

Figure 5:
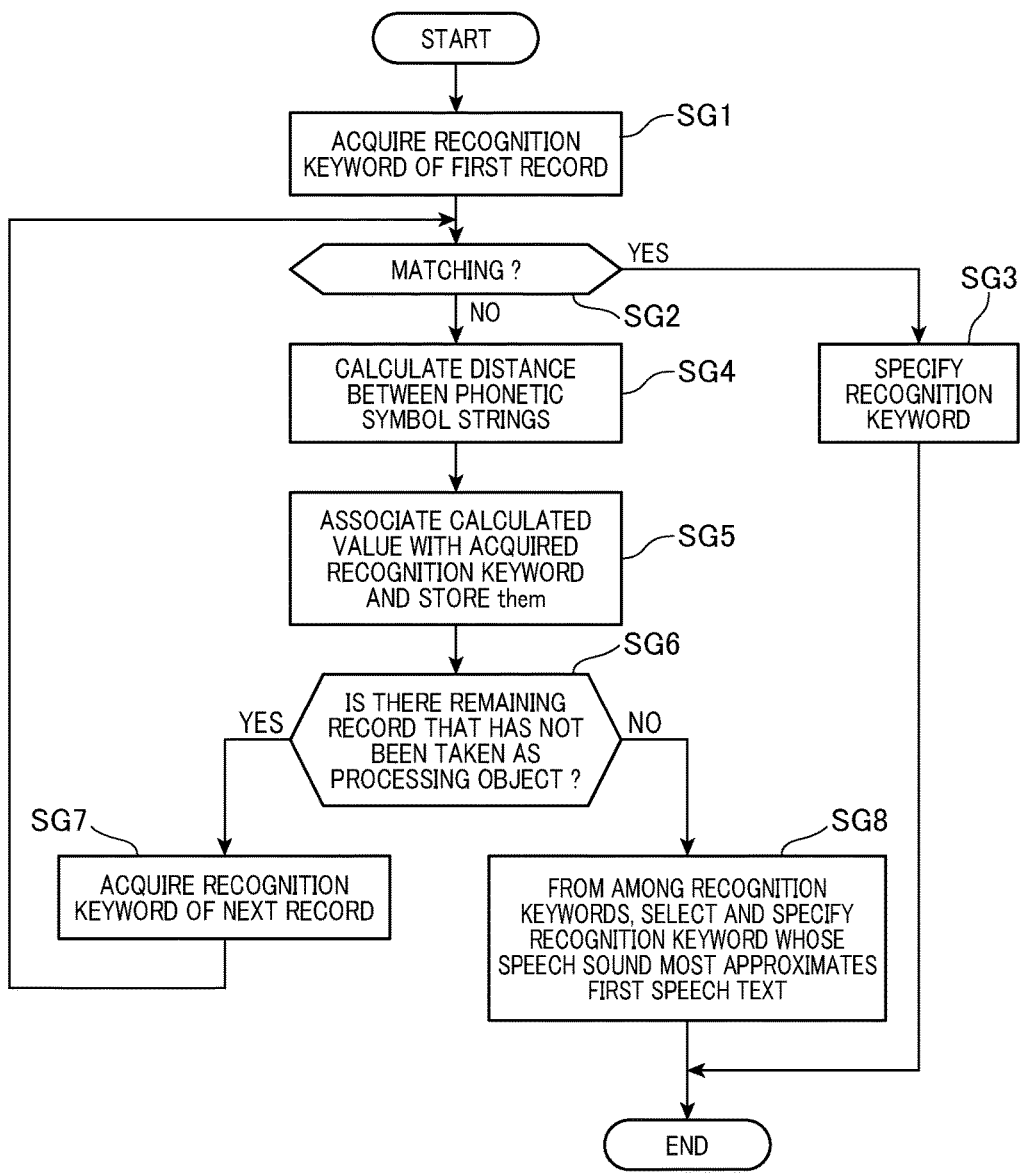
FIG. 5 is a flowchart illustrating operations of a control server.

FIG. 5 is a flowchart illustrating operations of the pictogram selection unit 811 when specifying a recognition keyword in the first specification method.

In the first specification method, among respective items of speech texts that are described in the speech text data, the pictogram selection unit 811 specifies one corresponding recognition keyword using the item of speech text which has the highest degree of recognition accuracy that is described first (hereunder, referred to as "first speech text"). Hereunder, this process is described in detail using the flowchart in FIG. 5.

As shown in FIG. 5, the pictogram selection unit 811 acquires the first record of the first pictogram correspondence table E1 as a record that is the processing object, and acquires the recognition keyword stored in the recognition keyword field FA1 of the acquired record (step SG1).

The pictogram selection unit 811 performs a character string comparison between the acquired recognition keyword and the first speech text to determine whether or not the acquired recognition keyword and the first speech text match (step SG2).

If the acquired recognition keyword and the first speech text match (step SG2: Yes), the pictogram selection unit 811 specifies the matched recognition keyword as a recognition keyword that corresponds to the speech text (step SG3), and then ends the processing.

If the acquired recognition keyword and the first speech text do not match (step SG2: No), the pictogram selection unit 811 calculates a phonetic symbol string distance between the first speech text and the acquired recognition keyword (step SG4). The term "phonetic symbol string distance" refers to a numerical value that indicates the degree of approximation between the speech sounds of the two text items that are the object of the character string comparison, with respect to which, the lower the numerical value is, the greater the degree of approximation that is indicated.

Hereunder, a method for calculating the phonetic symbol string distance will be described taking as an example a case in which the first speech text is "aiueo" and the recognition keyword is "kaiueo".

First, the pictogram selection unit 811 converts the first speech text and the recognition keyword into phonetic symbol strings. In the case of the present example, the pictogram selection unit 811 converts into "aiueo" with respect to the first speech text, and converts into "kaiueo" with respect to the recognition keyword.

Next, the pictogram selection unit 811 calculates an editing distance between the first speech text and the recognition keyword based on a comparison between the phonetic symbol string relating to the first speech text and the phonetic symbol string relating to the recognition keyword. The editing distance is one means for calculating a distance between the two phonetic symbol strings. The number of times a deletion, insertion or substitution to be performed in a case of performing the minimum deletions, insertions and substitutions with respect to "phonemes" constituting one of the phonetic symbol strings in order to make the one phonetic symbol string the same as the other phonetic symbol string is the editing distance. Note that, with regard to calculation of the editing distance, each alphabetic character constituting a phonetic symbol string corresponds to a "phoneme". For example, in the phonetic symbol string "aiu", "a", "i" and "u" are each a "phoneme".

Calculation of the editing distance based on a comparison between the phonetic symbol string "aiueo" relating to the first speech text and "kaiueo" relating to the recognition keyword is performed as described hereunder. That is, the phonetic symbol string relating to the recognition keyword can be made into the phonetic symbol string relating to the first speech text by deleting the first phoneme "k" of the phonetic symbol string relating to the recognition keyword. Accordingly, the editing distance between the first speech text and the recognition keyword is "1". Note that, when calculating the editing distance, a correction that reflects the ease with which a recognition error occurs may be performed.

Next, the pictogram selection unit 811 calculates a value that is obtained by dividing the calculated editing distance by the number of phonemes of the phonetic symbol string relating to the recognition keyword. The calculated value is the "phonetic symbol string distance". In the present example, since the value of the editing distance between the first speech text and the recognition keyword is "1", a value "0.17" obtained by dividing "1" by "6" that is the number of phonemes of the recognition keyword (≈1/6) is the phonetic symbol string distance between these texts.

After calculating the phonetic symbol string distance in step SG4, the pictogram selection unit 811 stores the calculated value in a predetermined storage region in association with the acquired recognition keyword (step SG5).

Next, the pictogram selection unit 811 determines whether or not a record that has not been taken as the processing object remains in the first pictogram correspondence table E1 (step SG6).

If a record that has not been taken as the processing object remains (step SG6: Yes), the next record after the record that was taken as the processing object is acquired by the pictogram selection unit 811 as the processing object, and the pictogram selection unit 811 acquires a recognition keyword stored in the recognition keyword field FA1 of the acquired record (step SG7), and then shifts the processing procedure to step SG2.

In contrast, if there are no remaining records that have not been taken as the processing object (step SG6: No), the pictogram selection unit 811 executes the processing described below (step SG8). Note that, when there are no remaining records that have not been taken as the processing object, a recognition keyword whose character string matches the character string of the first speech text does not exist in the first pictogram correspondence table E1.

In step SG8, the pictogram selection unit 811 acquires the phonetic symbol string distances that were calculated in step SG4 in correspondence with the respective recognition keywords that were stored in the first pictogram correspondence table E1, and specifies a recognition keyword that corresponds to the phonetic symbol string distance with the smallest value as the recognition keyword that corresponds to the speech text, and then ends the processing. In step SG8, from among the recognition keywords, the pictogram selection unit 811 selects and specifies the recognition keyword for which the speech sound most approximates the first speech text.

As described above, according to the first specification method, if a recognition keyword whose character string matches the first speech text exists in the first pictogram correspondence table E1, the pictogram selection unit 811 specifies the relevant recognition keyword. In contrast, if there is no matching recognition keyword, the pictogram selection unit 811 specifies a recognition keyword whose speech sound most approximates the first speech text from among the recognition keywords. Thereby, a recognition keyword corresponding to a speech sound that the user uttered can be selected with a high degree of accuracy and specified.

The pictogram selection unit 811 also specifies a pictogram ID that is associated with the specified recognition keyword in the first pictogram correspondence table E1. As described above, in some cases there is a plurality of corresponding pictogram IDs.

<Second Method for Specifying a Recognition Keyword (Second Specification Method)>

Next, a second method for specifying a recognition keyword (second specification method) will be described.

FIG. 4(B) is a view that illustrates the pictogram correspondence table 82a (hereunder, referred to as "second pictogram correspondence table E2") that is used when specifying a recognition keyword by a second specification method.

As shown in FIG. 4(B), a single record in the second pictogram correspondence table E2 includes a recognition keyword field FB1, a pictogram ID field FB2, a pictogram existence/non-existence field FB3, and a selection pictogram field FB4.

The recognition keyword field FB1 is a field in which recognition keywords are stored. In this case, recognition keywords stored in the second pictogram correspondence table E2 have the following characteristic in comparison with the recognition keywords stored in the first pictogram correspondence table E1. That is, in the recognition keyword field FB1 of the second pictogram correspondence table E2, recognition keywords that represent text in which an error in speech recognition is reflected are stored. For example, in a case where there is a possibility that, as the result of an error in speech recognition, "TOKAI", "KYOKAI", "KEIKAI" or "SHOKAI", may be generated as text when speech recognition is performed based on speech data that is based on the word "RYOKAI" that a user uttered, the aforementioned items of text are also stored in the recognition keyword field FB1 as recognition keywords. Note that, recognition keywords in which errors in speech recognition are reflected are appropriately set in consideration of the results of prior tests and simulation and the like.

Hereunder, a recognition keyword in which a speech recognition error is not reflected is referred to as a "main recognition keyword KW1", and a recognition keyword in which a speech recognition error is reflected is referred to as an "auxiliary recognition keyword KW2".

In a case where the recognition keyword stored in the recognition keyword field FB1 is the main recognition keyword KW1, one or a plurality of pictogram IDs corresponding to the main recognition keyword KW1 is stored in the corresponding pictogram ID field FB2 in the second pictogram correspondence table E2. Note that, if the recognition keyword stored in the recognition keyword field FB1 is the auxiliary recognition keyword KW2, a pictogram ID is not stored in the corresponding pictogram ID field FB2, and the pictogram ID field FB2 is left as null data.

Information indicating whether or not a corresponding pictogram exists is stored in the pictogram existence/non-existence field FB3. In the example in FIG. 4(B), "○" is information which indicates that a corresponding pictogram exists, and "×" is information which indicates that a corresponding pictogram does not exist. If the recognition keyword stored in the corresponding recognition keyword field FB1 is the main recognition keyword KW1, information which indicates that a corresponding pictogram exists is stored in the pictogram existence/non-existence field FB3. If the recognition keyword stored in the corresponding recognition keyword field FB1 is the auxiliary recognition keyword KW2, information which indicates that a corresponding pictogram does not exist is stored in the pictogram existence/non-existence field FB3.

If the recognition keyword that is stored in the corresponding recognition keyword field FB1 is the auxiliary recognition keyword KW2, the corresponding main recognition keyword KW1 is stored in the selection pictogram field FB4. The main recognition keyword KW1 that corresponds to the auxiliary recognition keyword KW2 is a recognition keyword in which an error that occurred with respect to the auxiliary recognition keyword KW2 is not reflected.

Figure 6:
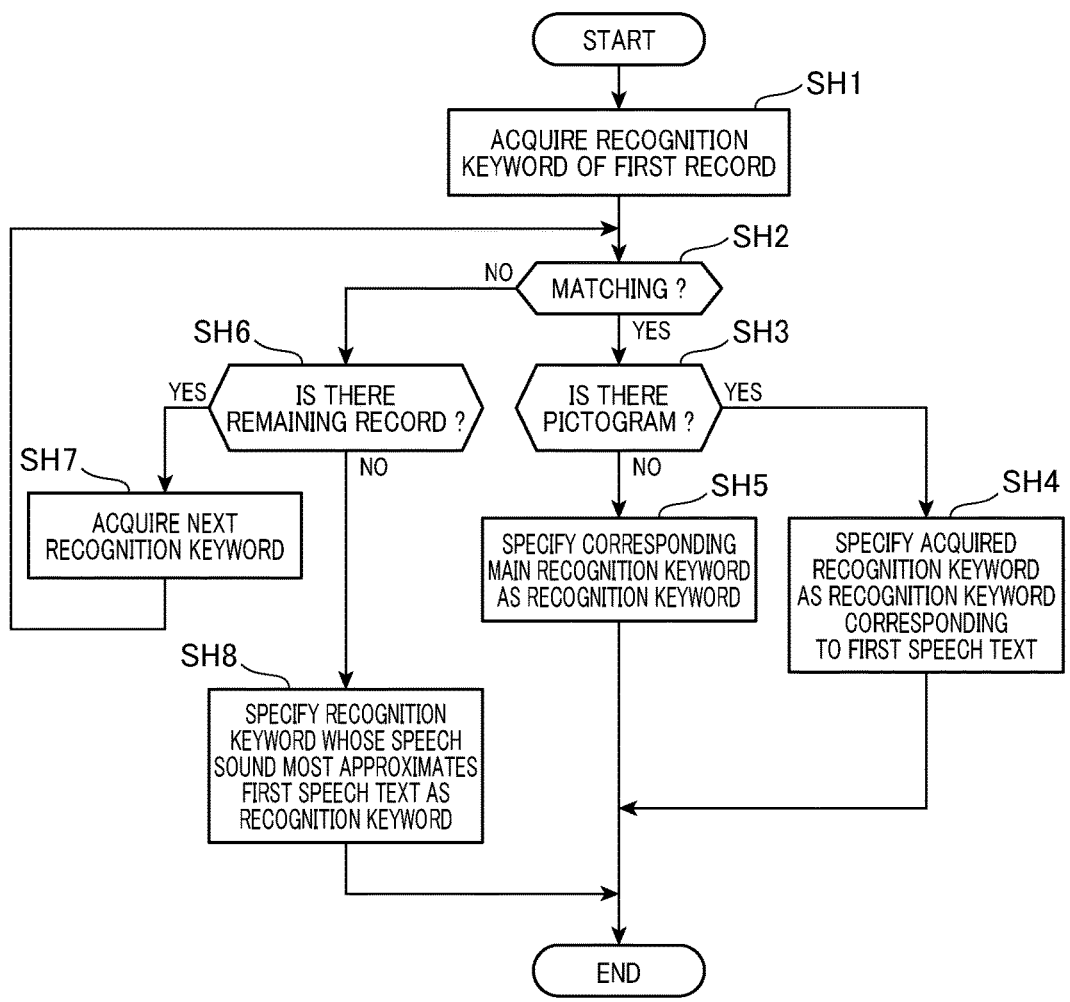
FIG. 6 is a flowchart illustrating operations of the control server.

FIG. 6 is a flowchart showing operations of the pictogram selection unit 811 when specifying a recognition keyword according to the second specification method.

In the second specification method, similarly to the above described first specification method, the pictogram selection unit 811 specifies one corresponding recognition keyword using the first speech text. Hereunder, this process is described in detail using the flowchart in FIG. 6.

As shown in FIG. 6, the pictogram selection unit 811 acquires a first record of the second pictogram correspondence table E2 as a record that is the processing object, and acquires the recognition keyword stored in the recognition keyword field FB1 of the acquired record (step SH1).

Next, the pictogram selection unit 811 performs a character string comparison between the acquired recognition keyword and the first speech text to determine whether or not the acquired recognition keyword and the first speech text match (step SH2).

If the acquired recognition keyword and the first speech text match (step SH2: Yes), the pictogram selection unit 811 refers to the pictogram existence/non-existence field FB3 of the record that is the processing object, and determines whether or not a corresponding pictogram exists (step SH3). If a corresponding pictogram exists (step SH3: Yes), in other words, when the acquired recognition keyword is the main recognition keyword KW1, the pictogram selection unit 811 specifies the acquired recognition keyword as the recognition keyword that corresponds to the first speech text (step SH4).

In contrast, in step SH3, if it is determined that a corresponding pictogram does not exist (step SH3: No), in other words, when the acquired recognition keyword is the auxiliary recognition keyword KW2, the pictogram selection unit 811 refers to the selection pictogram field FB4 and specifies the recognition keyword (=the corresponding main recognition keyword KW1) that is stored in the selection pictogram field FB4 as the recognition keyword that corresponds to the first speech text (step SH5).

In step SH2, if it is determined that the acquired recognition keyword and the first speech text do not match (step SH2: No), the pictogram selection unit 811 determines whether or not a record that has not been taken as the processing object remains in the second pictogram correspondence table E2 (step SH6).

If a record that has not been taken as the processing object remains (step SH6: Yes), the next record after the record that was taken as the processing object is acquired by the pictogram selection unit 811 as the processing object, and the pictogram selection unit 811 acquires a recognition keyword stored in the recognition keyword field FB1 of the acquired record (step SH7), and then shifts the processing procedure to step SH2.

In contrast, if there are no remaining records that have not been taken as the processing object (step SH6: No), the pictogram selection unit 811 executes the processing described below (step SH8). Note that, when there are no remaining records that have not been taken as the processing object, a recognition keyword having a character string that matches the first speech text does not exist in the second pictogram correspondence table E2. In step SH8, by the aforementioned method, from among the main recognition keywords KW1 stored in the recognition keyword field FB1, the pictogram selection unit 811 selects the main recognition keyword KW1 whose speech sound most approximates the first speech text, and specifies the selected main recognition keyword KW1 as the recognition keyword corresponding to the first speech text.

The pictogram selection unit 811 also specifies a pictogram ID that is associated with the specified recognition keyword in the second pictogram correspondence table E2. As described above, in some cases there is a plurality of corresponding pictogram IDs.

According to the second specification method that is described above, the amount of data in the second pictogram correspondence table E2 that is used is greater than in the first pictogram correspondence table E1 that is used in the first specification method. Further, since it is necessary to store the auxiliary recognition keywords KW2 in the recognition keyword field FB1, in comparison to the first pictogram correspondence table E1 used in the first specification method, more labor is required to generate the second pictogram correspondence table E2 that is used in the second specification method. On the other hand, the probability is higher and the processing efficiency is better in the second specification method in comparison to the first specification method, and in the second specification method it is also not necessary to perform processing to select a recognition keyword that approximates the first speech text, such as calculating values for a phonetic symbol string distance and comparing the calculated values.

<Third Method for Specifying Recognition Keyword (Third Specification Method)>

Next, a third method for specifying a recognition keyword (third specification method) will be described.

In the third specification method, the pictogram selection unit 811 uses the first pictogram correspondence table E1 in FIG. 4(A) as the pictogram correspondence table 82a. Further, in the third specification method, the pictogram selection unit 811 uses five items of speech text that are described in descending order of the degree of recognition accuracy for the respective items of speech text. Hereunder, the four items of speech text other than the first speech text are referred to as, in descending order of the degree of recognition accuracy, "second speech text", "third speech text", "fourth speech text" and "fifth speech text".

Figure 7:
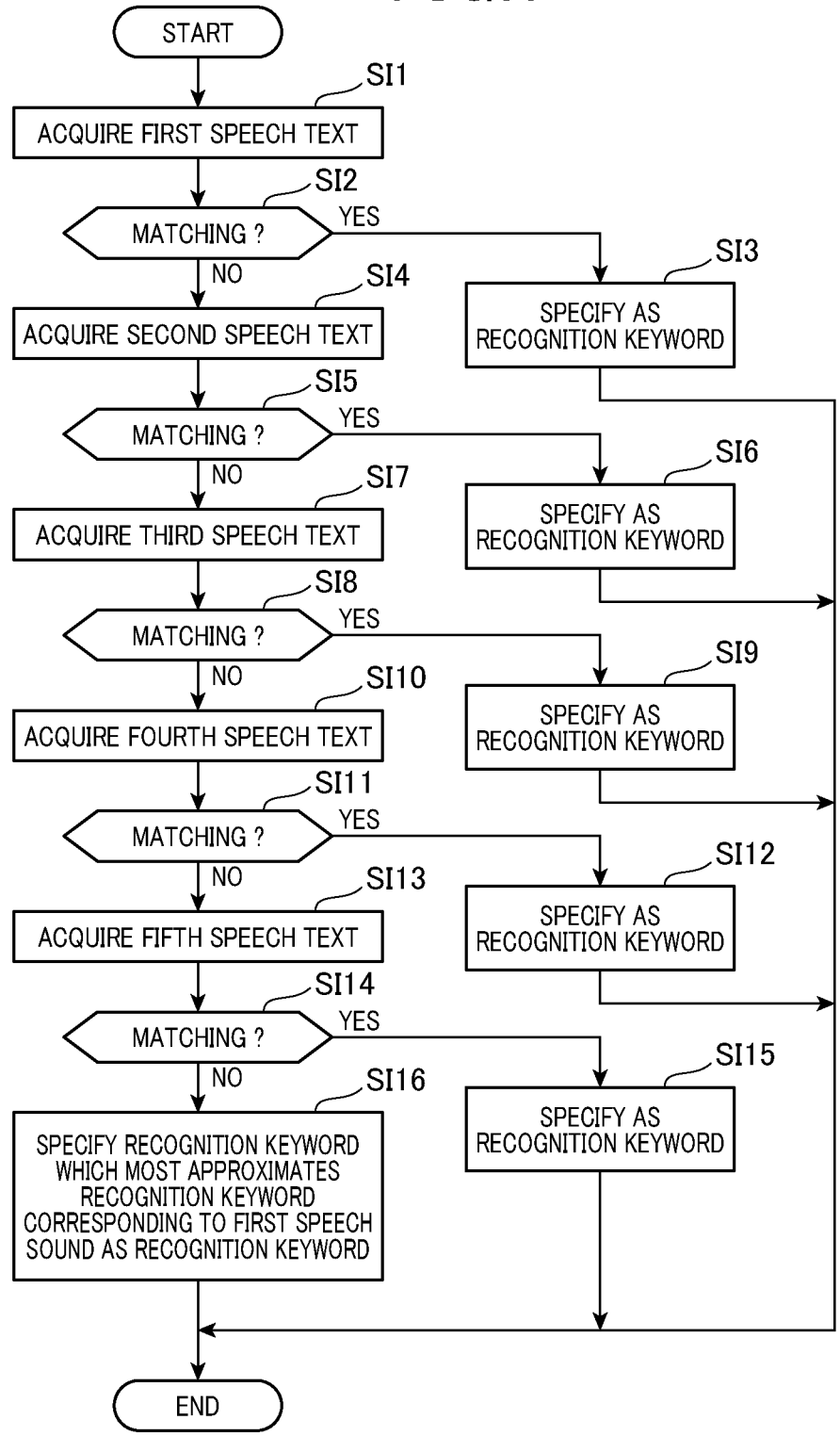
FIG. 7 is a flowchart illustrating operations of the control server.

FIG. 7 is a flowchart illustrating operations of the pictogram selection unit 811 when specifying a recognition keyword according to the third specification method.

As shown in FIG. 7, the pictogram selection unit 811 refers to the speech text data to acquire the first speech text as the speech text that is the processing object (step SI1).

Next, the pictogram selection unit 811 refers to the recognition keyword field FA1 of each record in the first pictogram correspondence table E1 to determine whether or not there is a recognition keyword whose character string matches the first speech text data among the recognition keywords (step SI2).

If there is a recognition keyword whose character string matches the first speech text data (step SI2: Yes), the pictogram selection unit 811 specifies the recognition keyword having the matching character string as the recognition keyword that corresponds to the speech text (step SI3).

If there is no recognition keyword whose character string matches the first speech text data (step SI2: No), the pictogram selection unit 811 shifts the processing procedure to step SI4.

In step SI4 to step SI15, the pictogram selection unit 811 acquires speech text in sequential order from the second speech text toward the fifth speech text, compares the acquired speech text with the recognition keyword stored in the first pictogram correspondence table E1, and if the acquired speech text matches the recognition keyword, the pictogram selection unit 811 specifies the matched recognition keyword as the recognition keyword that corresponds to the speech text, and then ends the processing.

On the other hand, if there is no speech text among the first speech text to the fifth speech text with respect to which the character string matches that of the recognition keyword stored in the first pictogram correspondence table E1, the pictogram selection unit 811 shifts the processing procedure to step SI16. In step SI16, by the above described method, the pictogram selection unit 811 selects a recognition keyword whose speech sound most approximates the first speech text among the recognition keywords stored in the recognition keyword field FA1, and specifies the selected recognition keyword as the recognition keyword that corresponds to the speech text.

In addition, the pictogram selection unit 811 specifies a pictogram ID that is associated with the specified recognition keyword in the first pictogram correspondence table E1. As described above, in some cases there is a plurality of corresponding pictogram IDs.

According to the third specification method that is described above, specification of a recognition keyword can be performed by effectively utilizing the fact that five items of speech text are described in descending order of the degree of recognition accuracy in the speech text data. Further, the probability is higher and the processing efficiency is better in to the third specification method in comparison to the first specification method, and in the third specification method it is also not necessary to perform processing to select a recognition keyword that approximates the first speech text, such as calculating values for a phonetic symbol string distance and comparing calculated values.

While methods for specifying a recognition keyword have been described above using three examples, the method for specifying a recognition keyword is not limited to the methods that are exemplified above.

Returning to FIG. 3(C), after executing the keyword specification processing in step SC4, the pictogram selection unit 811 executes pictogram selection processing (step SC5). Hereunder, the pictogram selection processing will be described in detail.

The pictogram selection processing is processing that selects a pictogram ID of a pictogram to be sent as a message from among a plurality of pictogram IDs in a case where there are a plurality of pictogram IDs corresponding to the recognition keyword specified by the keyword specification processing in step SC4. Note that, in a case where there is one pictogram ID corresponding to the recognition keyword, the pictogram selection unit 811 selects the relevant pictogram ID as the pictogram ID of the pictogram to be sent as a message, without using the pictogram selection processing.

The contents of the pictogram selection processing differ between a case in which the vehicle 2 is stopped and a case in which the vehicle 2 is not stopped. Hereunder, first, pictogram selection processing in a case where the vehicle 2 is stopped will be described, and next the pictogram selection processing in a case where the vehicle 2 is not stopped will be described. Note that, the pictogram selection unit 811 determines whether or not the vehicle 2 is stopped based on the traveling state information received in step SC1.

<Pictogram Selection Processing when Vehicle 2 is Stopped>

In a case where the vehicle 2 is stopped, the pictogram selection unit 811 causes the user to select a single pictogram from among the pictograms corresponding to the plurality of pictogram IDs, and selects the pictogram ID corresponding to the pictogram selected by the user as the pictogram ID of the pictogram to be sent as a message.

More specifically, the pictogram selection unit 811 communicates with the dedicated application AP of the portable terminal 4 and the corresponding application TP of the vehicle-mounted device 3, outputs the necessary information to these applications, and displays on the touch panel 33 a user interface on which pictograms corresponding to the plurality of pictogram IDs are displayed and which causes the user to select any one of the pictograms. Note that, in the present embodiment, the dedicated application AP has a database in which pictogram IDs and data which is required to display pictograms, such as image data of pictograms, are associated, and conversion from a pictogram ID to a pictogram is performed by a function of the dedicated application AP.

Figure 8:
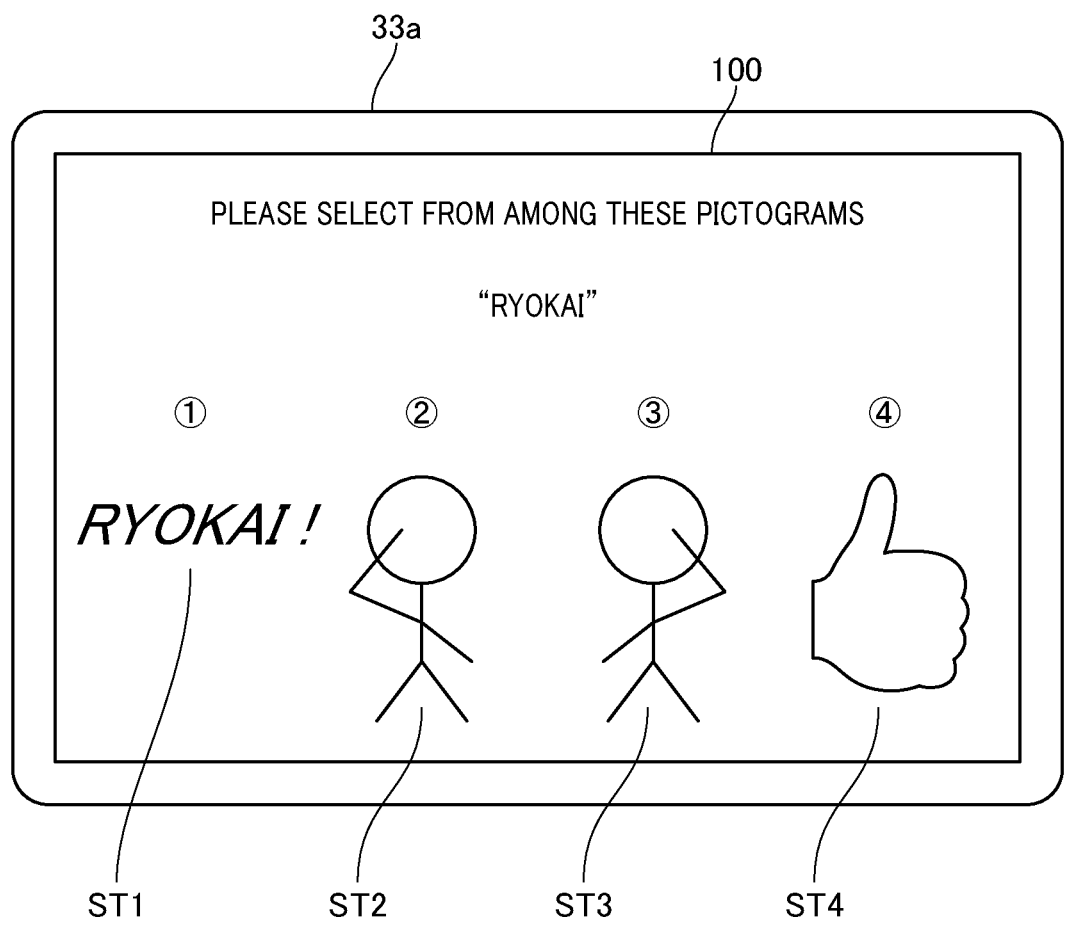
FIG. 8 is a view illustrating an example of a user interface that is displayed on a vehicle-mounted device.

FIG. 8 is a view illustrating an example of a user interface that is displayed on the touch panel 33. In the example in FIG. 8, four pictograms, namely, pictograms ST1 to ST4, which correspond to the recognition keyword "RYOKAI" are displayed on the screen. The user selects any one of the pictograms by a performing a touch operation on a region corresponding to the relevant pictogram. Because the vehicle 2 is stopped, it is possible for the user to refer to the user interface and select a desired pictogram.

The dedicated application AP of the portable terminal 4 and the corresponding application TP of the vehicle-mounted device 3 cooperate to output the pictogram ID of the pictogram selected by the user to the pictogram selection unit 811. The pictogram selection unit 811 selects the pictogram ID that is inputted.

As described above, when the vehicle 2 is stopped, because the state is one in which the user can perform corresponding operations on the vehicle-mounted device 3, the pictogram selection unit 811 causes the user to select a pictogram, and selects the corresponding pictogram ID. Thereby, based on the fact that the vehicle 2 is stopped, the user can reliably select a pictogram ID that corresponds to the desired pictogram.

<Pictogram Selection Processing when Vehicle 2 is not Stopped>

Hereunder, two methods with respect to pictogram selection processing in a case where the vehicle 2 is not stopped are exemplified.

<First Method of Pictogram Selection Processing when Vehicle 2 is not Stopped>

Figure 9:
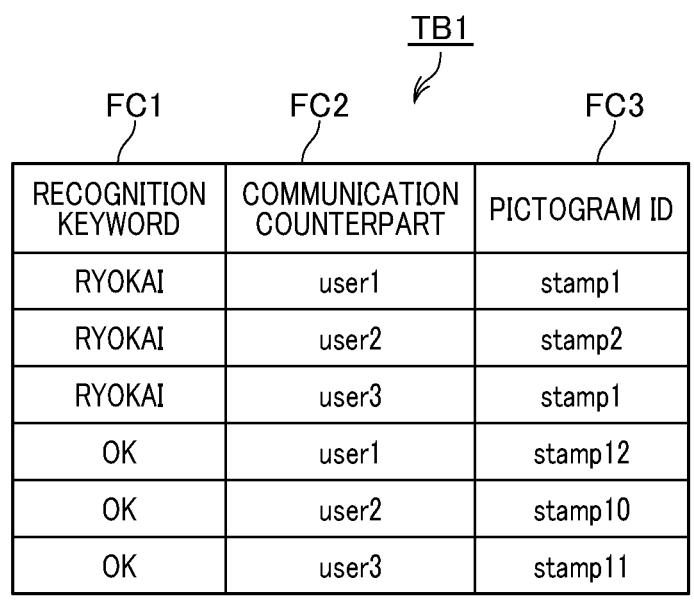
FIG. 9 is a view illustrating a first table.

FIG. 9 is a view illustrating the data structure of a first table TB1 that is used in pictogram selection processing according to a first method.

As shown in FIG. 9, a single record in the first table TB1 includes a recognition keyword field FC1, a communication counterpart field FC2 and a pictogram ID field FC3. The main recognition keyword KW1 is stored in the recognition keyword field FC1. The user ID of the communication counterpart is stored in the communication counterpart field FC2. The pictogram ID is stored in the pictogram ID field FC3. That is, a recognition keyword, a user ID and a pictogram ID are associated in a single record in the first table TB1.

The meaning of a single record of the first table TB1 is as follows. That is, the meaning of a single record is that, in the case of sending a pictogram that corresponds to the recognition keyword stored in the recognition keyword field FC1 to a communication counterpart having the user ID stored in the communication counterpart field FC2, a pictogram is sent that has the pictogram ID stored in the pictogram ID field FC3.

Note that, the user can performs editing (addition of a record, deleting of a record, alteration of information of a record or the like) of the first table TB1 at an arbitrary timing when the vehicle 2 is stopped. That is, it is possible for the dedicated application AP of the portable terminal 4 and the corresponding application TP of the vehicle-mounted device 3 to provide a user interface with which input operations relating to editing of the first table TB1 can be performed. The user performs various input operations utilizing the user interface to edit the first table TB1.

In the pictogram selection processing according to the first method, the pictogram selection unit 811 refers to the first table TB1. Next, the pictogram selection unit 811 specifies a record in which the recognition keyword specified by the keyword specification processing in step SC4 is stored in the recognition keyword field FC1, and in which the user ID received in step SC1 is stored in the communication counterpart field FC2. The pictogram selection unit 811 then acquires the pictogram ID stored in the pictogram ID field FC3 of the specified record. The pictogram selection unit 811 selects the acquired pictogram ID as the pictogram ID of the pictogram to be sent as a message.

The pictogram ID selected by the pictogram selection processing according to the first method is the pictogram ID of a pictogram that the user selected in advance for each communication counterpart.

<Second Method of Pictogram Selection Processing when Vehicle 2 is not Stopped>

FIG. 10 is a view illustrating the data structure of a second table TB2 that is used in pictogram selection processing according to a second method.

As shown in FIG. 10, a single record in the second table TB2 includes a recognition keyword field FD1, a pictogram ID field FD2, a communication counterpart field FD3 and a usage frequency field FD4.

The main recognition keyword KW1 is stored in the recognition keyword field FD1. A pictogram ID is stored in the pictogram ID field FD2. The user ID is stored in the communication counterpart field FD3. Information indicating a usage frequency (described later) is stored in the usage frequency field FD4. That is, a recognition keyword, a pictogram ID, a user ID and information indicating a usage frequency (hereunder, referred to as "usage frequency information") are associated in a single record in the second table TB2.

The meaning of a single record of the second table TB2 is as follows. That is, a single record means that, in the case of sending a pictogram that corresponds to the recognition keyword stored in the recognition keyword field FD1 to a communication counterpart having the user ID stored in the communication counterpart field FD3, a usage frequency with which the user uses the pictogram having the pictogram ID stored in the pictogram ID field FC3 is the usage frequency that is shown by the usage frequency information stored in the usage frequency field FD4. In the present example, the usage frequency information is taken as information with which, for a single user, it is possible to identify which pictogram ID has the highest usage frequency among a plurality of pictogram IDs corresponding to a single recognition keyword.

Note that, the second table TB2 is automatically updated by the pictogram selection unit 811. For example, the pictogram selection unit 811 receives from the dedicated application AP of the portable terminal 4, at a predetermined timing, information that shows the pictogram IDs of pictograms that were sent utilizing the message sending and receiving system, the user IDs of communication counterparts that sent the pictograms, and the dates and times that the pictogram IDs were sent. The pictogram selection unit 811 stores the received information in a predetermined database. Further, based on the information stored in the database and by means of a predetermined statistical method, for each combination of a user ID and a pictogram ID, the pictogram selection unit 811 calculates the usage frequency, and based on the calculated usage frequency, adds a record to the second table TB2 or rewrites usage frequency information of an existing record.

Further, for example, the pictogram selection unit 811 receives information that is necessary for calculating a usage frequency from the messenger server 9, calculates a usage frequency based on the received information and, on the basis of the calculated usage frequency, adds a record to the second table TB2 or rewrites usage frequency information of an existing record. Note that, a providing source that provides information required for calculating a usage frequency to the pictogram selection unit 811 may be of any kind, and a method for updating the second table TB2 may also be of any kind.

In the pictogram selection processing according to the second method, the pictogram selection unit 811 refers to the second table TB2. Next, the pictogram selection unit 811 identifies a record in which the recognition keyword specified by the keyword specification processing in step SC4 is stored in the recognition keyword field FD1, and in which the user ID received in step SC1 is stored in the communication counterpart field FD3.

In a case where there is one identified record, in other words, in a situation in which, among a plurality of pictograms corresponding to a recognition keyword, only the pictogram corresponding to the identified record was used by the user in the past, the pictogram selection unit 811 selects the pictogram ID stored in the pictogram ID field FD2 of the identified record as the pictogram ID of the pictogram to be sent as a message.

If there are a plurality of identified records, in other words, in a situation in which, among a plurality of pictograms corresponding to a recognition keyword, a plurality of pictograms were used by the user in the past, the pictogram selection unit 811 acquires usage frequency information stored in the usage frequency field FD4 of the respective records. Next, based on the respective items of usage frequency information that are acquired, the pictogram selection unit 811 identifies the pictogram ID having the highest usage frequency, and selects the identified pictogram ID as the pictogram ID of the pictogram to be sent as a message. By selecting a pictogram ID in this way, it is possible to select a suitable pictogram ID in which the past manner of usage of the user is reflected as the pictogram ID of a pictogram to be sent to the specific communication counterpart.

In a case where there is not even one identified record, in other words, in a situation in which no pictogram among a plurality of pictograms corresponding to a recognition keyword has been used by the user in the past, the pictogram selection unit 811 selects an arbitrary one pictogram ID among the plurality of pictogram IDs corresponding to the recognition keyword as the pictogram ID of the pictogram to be sent as a message. The arbitrary one pictogram ID may be a pictogram ID that was previously determined as a default value or may be a pictogram ID that was set by the user.

Although two methods have been described above as methods of pictogram selection processing in a case where the vehicle 2 is not stopped, the processing method is not limited to the methods exemplified above. Further, a configuration may also be adopted that allows a user to switch between a plurality of methods.

Returning to FIG. 3(C), after the pictogram selection processing in step SC5 is completed, the server control unit 81 controls the server communication unit 83 to send the pictogram ID selected by the pictogram selection processing in step SC5 and the user ID received in step SC1 to the messenger server 9 (step SC6). In step SC6, in addition to the pictogram ID and the user ID, information is added that is required in order for the messenger server 9 to send the pictogram ID in an appropriate form to the communication-destination portable terminal 5, such as the operating mode of the vehicle-mounted device 3 and the user ID of the user riding in the vehicle 2. The server control unit 81 communicates with the dedicated application AP of the portable terminal 4 and the corresponding application TP of the vehicle-mounted device 3 to acquire such information at a predetermined timing by predetermined means.

As shown in FIG. 3(E), the messenger server 9 receives the pictogram ID and the user ID (step SE1). Next, the messenger server 9 identifies the communication-destination portable terminal 5 corresponding to the user ID, and sends the pictogram ID to the identified communication-destination portable terminal 5 (step SE2).

As shown in FIG. 3(F), the communication-destination portable terminal 5 receives the pictogram ID, and displays a pictogram corresponding to the pictogram ID in a region for displaying the received pictogram on a predetermined screen.

As shown in FIG. 3(C), together with the transmission of information to the messenger server 9, the server control unit 81 of the control server 8 sends the pictogram ID to the portable terminal 4 utilizing the connection established with the portable terminal 4 (step SC7).

As shown in FIG. 3(B), the terminal control unit 40 of the portable terminal 4 controls the network communication unit 44 to receive the pictogram ID (step SB4).

Next, based on the received pictogram ID, the terminal control unit 40 displays a pictogram corresponding to the pictogram ID in a region for displaying the pictogram that was sent on a predetermined screen (step SB5).

Thereafter, the terminal control unit 40 controls the short-range radio communication unit 43 to send information relating to the change to the screen that was performed by the processing in step SB5 to the vehicle-mounted device 3 (step SB6).

As shown in FIG. 3(A), the control unit 31 of the vehicle-mounted device 3 receives the information relating to the change to the screen (step SA4).

Next, based on the received information, the control unit 31 changes the screen that corresponds to the screen of the portable terminal 4, that is displayed on the touch panel 33 (step SA5). By means of the processing in step SA5, the screen of the touch panel 33 changes in synchrony with the screen of the portable terminal 4, and the pictogram that was sent is displayed on the screen of the touch panel 33.

Note that, the processing units in the flowchart in FIG. 3 are units obtained by dividing the processing according to the main processing contents to facilitate understanding of the processing of the respective apparatuses. The invention of the present application is not limited by the manner in which the processing units are divided or the names thereof. The processing of the respective apparatuses can also be divided into a larger number of processing units in accordance with the processing contents. Further, the processing of the respective apparatuses can also be divided so that a single processing unit includes more processing. Further, the order of processing is not limited to the examples illustrated in the drawings.

As described above, the information processing system 1 according to the present embodiment includes the control server 8 (information processing apparatus), and the vehicle-mounted device 3 that is mounted in the vehicle 2.

The vehicle-mounted device 3 includes the sound pickup unit 36 that picks up a speech sound, and the transmitting unit (the control unit 31 and communication unit 37) that transmits speech data that is generated based on a speech sound that is picked up by the sound pickup unit 36 to the control server 8.

The control server 8 includes: the server storage unit 82 (storage unit) which stores the pictogram correspondence table 82a (pictogram correspondence information) in which recognition keywords (keywords) and pictogram IDs (pictogram information) indicating a plurality of pictograms which correspond to the recognition keyword are associated; and the server control unit 81 that executes pictogram processing which selects the recognition keyword corresponding to text representing a speech sound that is generated by speech recognition based on the speech data from among the recognition keywords of the pictogram correspondence table 82a, and in accordance with a predetermined condition, selects one pictogram ID from among a plurality of pictogram IDs that are associated with the recognition keyword that is selected.

According to this configuration, in a case where there is a plurality of pictograms corresponding to a speech sound uttered inside the vehicle 2, since one pictogram is selected in accordance with a predetermined condition by the control server 8, it is not necessary for a user to perform an operation to select a pictogram, and thus the convenience of the user is improved.

In the present embodiment, in the pictogram correspondence table 82a that is stored in the server storage unit 82 of the control server 8, pictogram IDs and information showing the usage frequency of pictograms are stored in association with each other. Further, during pictogram selection processing, it is possible for the server control unit 81 of the control server 8 to select a single pictogram ID that corresponds to a pictogram that is used with the highest frequency from among a plurality of pictogram IDs associated with a selected recognition keyword.

According to this configuration, the control server 8 can select a single pictogram that reflects the usage frequency of the user from among a plurality of pictograms.

Further, in the present embodiment, with respect to the pictogram IDs in the pictogram correspondence table 82a, the server storage unit 82 of the control server 8 associates the respective pictogram IDs with a user ID (information showing a communication counterpart), and stores information showing the frequency at which a corresponding pictogram has been used. Subsequently, during the pictogram selection processing, it is possible for the server control unit 81 of the control server 8 to acquire a user ID (communication counterpart to which to output the pictogram) and select one pictogram ID that corresponds to the pictogram that is used with the highest frequency when outputting to the acquired user ID from among a plurality of pictogram IDs associated with the selected recognition keyword.

According to this configuration, the control server 8 can select a single pictogram from among a plurality of pictograms in a manner that reflects the usage frequency of the user in accordance with the communication counterpart.

Further, in the present embodiment, during the pictogram selection processing, it is possible for the server control unit 81 of the control server 8 to select a single pictogram ID that is set in advance, from among a plurality of pictogram IDs associated with a selected recognition keyword.

According to this configuration, the control server 8 can select a single pictogram that is set in advance from among a plurality of pictograms.

Furthermore, in the present embodiment, when selecting a recognition keyword that corresponds to speech text that is based on speech data from among the recognition keywords in the pictogram correspondence table 82a, the server control unit 81 of the control server 8 performs a selection in which an error in speech recognition is reflected.

According to this configuration, the control server 8 can select an appropriate single recognition keyword that reflects the recognition of a speech sound.

Further, in the present embodiment, the server control unit 81 of the control server 8 determines whether or not the vehicle 2 in which the vehicle-mounted device 3 that is the sending source of speech data is mounted is traveling. If the vehicle 2 is traveling, the server control unit 81 executes pictogram selection processing, while if the vehicle 2 is not traveling the server control unit 81 communicates with the vehicle-mounted device 3 to cause the vehicle-mounted device 3 to execute processing that causes a user to select a single pictogram from among pictograms that correspond to a plurality of pictogram IDs which are associated with a selected recognition keyword, and selects a single pictogram ID that corresponds to the single pictogram selected by the user.

According to this configuration, during a state in which the vehicle 2 is stopped and it is possible for the user to perform corresponding operations on the vehicle-mounted device 3, a desired pictogram can be reliably selected by causing the user to select a single pictogram from among a plurality of pictograms.

First Modification Example

Next, a first modification example will be described.

Figure 11:
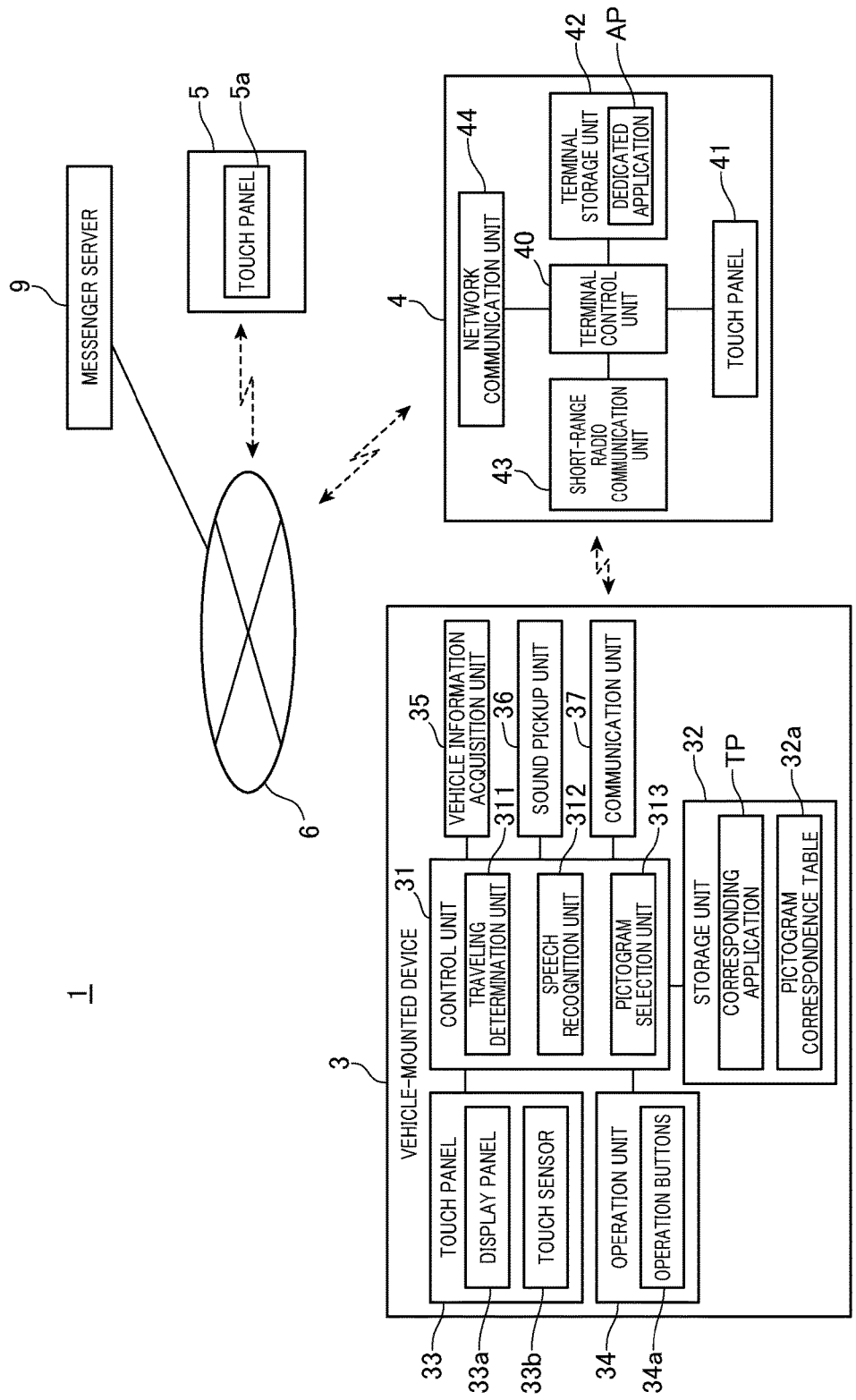
FIG. 11 is a view illustrating an information processing system according to a first modification example.

FIG. 11 is a view illustrating the configuration of an information processing system 1 according to the first modification example. In the following description, constituent elements that are the same as constituent elements of the information processing system 1 according to the first embodiment that is described above are assigned the same reference numerals as in the first embodiment, and a detailed description thereof is omitted.

As will be apparent by comparing FIG. 2 and FIG. 11, in the information processing system 1 according to the first modification example, the control unit 31 of the vehicle-mounted device 3 has a pictogram selection unit 313 as a functional block. The pictogram selection unit 313 is a functional block that has the same functions as the pictogram selection unit 811 in the above described embodiment. That is, in the first modification example, the vehicle-mounted device 3 executes keyword specification processing and pictogram selection processing.

The control unit 31 also has a speech recognition unit 312. In addition, the storage unit 32 has a pictogram correspondence table 32a. The pictogram correspondence table 32a is data that corresponds to the pictogram correspondence table 82a in the above described embodiment.

Next, the operations of the respective apparatuses of the information processing system 1 according to the first modification example in the case of sending a pictogram as a message to the communication-destination portable terminal 5 will be described.

In the vehicle 2, a user utters a speech sound that represents a pictogram. The speech sound uttered by the user is picked up by the sound pickup unit 36 and is output to the control unit 31 as speech data.

The speech recognition unit 312 of the control unit 31 performs speech recognition to generate speech text data based on the speech data that is input. Thus, in the first modification example, the vehicle-mounted device 3 has a function that performs speech recognition and generates speech text data based on speech data.

Next, the pictogram selection unit 313 performs keyword specification processing and specifies a recognition keyword. The pictogram selection unit 313 then performs pictogram selection processing to select a single pictogram ID from among a plurality of pictogram IDs corresponding to the specified recognition keyword.

Next, the control unit 31 communicates with the messenger server 9 through the portable terminal 4, and sends a pictogram having the selected pictogram ID to the communication-destination portable terminal 5 as a message. Further, the control unit 31 and the terminal control unit 40 of the portable terminal 4 cooperate to display the sent pictogram as an outgoing message history.

As shown in the first modification example described above, a configuration may be adopted in which the vehicle-mounted device 3 executes the speech recognition, keyword specification processing and pictogram selection processing. In the case of such a configuration also, similar advantageous effects as in the above described embodiment can be achieved.

Second Modification Example

Next, a second modification example will be described.

Figure 12:
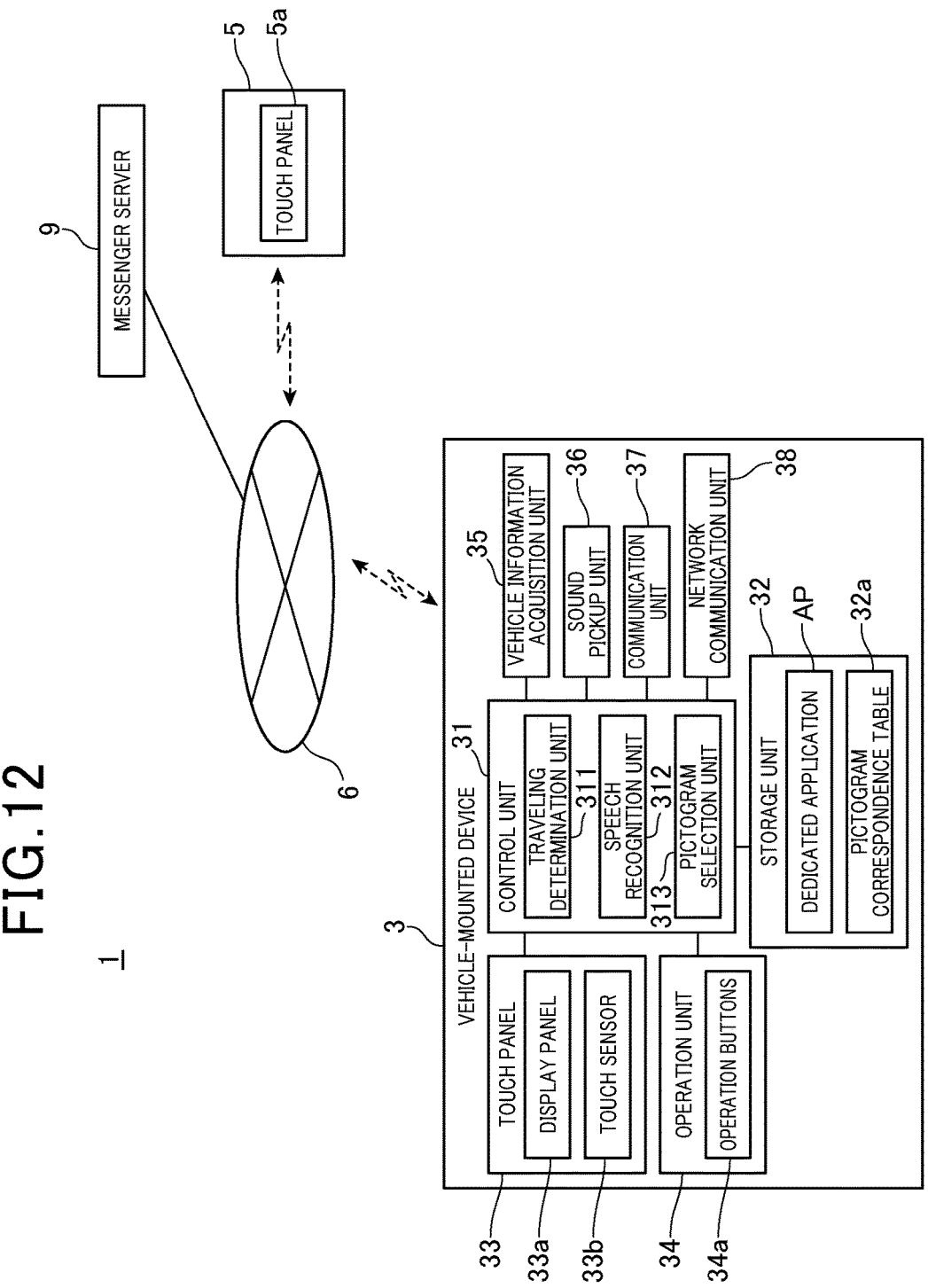
FIG. 12 is a view illustrating an information processing system according to a second modification example.

FIG. 12 is a view illustrating the configuration of an information processing system 1 according to the second modification example.

As will be apparent by comparing FIG. 2 and FIG. 12, in the second modification example the vehicle-mounted device 3 has a network communication unit 38, and the vehicle-mounted device 3 can communicate with devices connected to the network 6, by means of a function of the network communication unit 38.

Further, in the second modification example, the dedicated application AP is installed in the vehicle-mounted device 3. By means of a function of the dedicated application AP, the vehicle-mounted device 3 utilizes a message transmission system that the messenger server 9 provides, and can send and receive messages to and from the communication-destination portable terminal 5.

Next, the operations of the respective apparatuses of the information processing system 1 according to the second modification example in the case of sending a pictogram as a message to the communication-destination portable terminal 5 will be described.

In the vehicle 2, a user utters a speech sound that represents a pictogram. The speech sound uttered by the user is picked up by the sound pickup unit 36 and is output to the control unit 31 as speech data.

The speech recognition unit 312 of the control unit 31 performs speech recognition to generate speech text data based on the speech data that is input. Thus, in the second modification example, the vehicle-mounted device 3 has a function that performs speech recognition and generates speech text data based on speech data.

Next, the pictogram selection unit 313 performs keyword specification processing and specifies a recognition keyword. The pictogram selection unit 313 then performs pictogram selection processing to select a single pictogram ID from among a plurality of pictogram IDs corresponding to the specified recognition keyword.

Next, the control unit 31 controls the network communication unit 38 to communicate with the messenger server 9, and sends a pictogram having the selected pictogram ID to the communication-destination portable terminal 5 as a message. Further, the control unit 31 displays the sent pictogram as an outgoing message history.

As shown in the second modification example described above, a configuration may also be adopted in which the vehicle-mounted device 3 executes the speech recognition, keyword specification processing and pictogram selection processing. In addition, a configuration may be adopted in which the dedicated application AP is installed in the vehicle-mounted device 3, and the vehicle-mounted device 3 sends and receives messages utilizing a message transmission system. In the case of such a configuration also, similar advantageous effects as in the above described embodiment can be achieved.

The above described embodiment merely exemplifies one aspect of the present invention, and arbitrary modifications and applications are possible within a range that does not depart from the gist of the present invention.

For example, although in the above described embodiment the messenger server 9 and the control server 8 are exemplified as separate elements to each other, these servers may be the same server. That is, the control server 8 may have the functions of the messenger server 9.

Further, although in the above described embodiment the invention is described taking as an example a case where messages are sent and received in the form of a chat between the portable terminal 4 and the communication-destination portable terminal 5, sending and receiving of messages is not limited to the form of a chat, and may be in a different form, such as in the form of emails.

REFERENCE SIGNS LIST

1 Information processing system
2 Vehicle
3 Vehicle-mounted device
8 Control server (information processing apparatus)
36 Sound pickup unit
81 Server control unit (control unit)
82a Pictogram correspondence table (pictogram correspondence information)

The invention claimed is:

1. An information processing system comprising:
an information processing apparatus; and
a vehicle-mounted device that is mounted in a vehicle, wherein
the vehicle-mounted device includes:
a microphone that picks up a speech sound, and
a transmitter that transmits speech data that is generated based on the speech sound that is picked up by the microphone to the information processing apparatus; and
the information processing apparatus includes:
a memory which stores pictogram correspondence information in which keywords and pictogram information indicating a plurality of pictograms which correspond to the keyword are associated, and
a CPU that executes pictogram selection processing which selects the keyword corresponding to text representing a speech sound that is generated by speech recognition based on the speech data from among the keywords which the pictogram correspondence information includes, and in accordance with a predetermined condition, selects one item of the pictogram information from among a plurality of items of the pictogram information that are associated with the keyword that is selected,
the CPU of the information processing apparatus determines whether or not the vehicle in which the vehicle-mounted device that is a sending source of the speech data is mounted is traveling,
and if the vehicle is traveling, the CPU of the information processing executes the pictogram selection processing,
and if the vehicle is not traveling, the CPU of the information processing communicates with the vehicle-mounted device to cause the vehicle-mounted device to execute processing that causes a user to select one of the pictograms from among the pictograms corresponding to a plurality of items of the pictogram information associated with the keyword that is selected, and selects one item of the pictogram information that corresponds to the one pictogram that is selected by the user.

2. The information processing system according to claim 1, wherein the pictogram is selected by a user using a predetermined data sending and receiving system, and is output to a specified communication counterpart, wherein
with respect to the pictogram information that the pictogram correspondence information includes, the memory of the information processing apparatus stores information indicating a frequency at which the pictograms corresponding to the pictogram information are used, and
in the pictogram selection processing, the CPU of the information processing apparatus selects one item of the pictogram information that corresponds to the pictogram which is used with highest frequency from among a plurality of items of the pictogram information associated with the keyword that is selected.

3. The information processing system according to claim 2, wherein with respect to the pictogram information that the pictogram correspondence information includes, the memory of the information processing apparatus stores information indicating a frequency with which the pictograms corresponding to the pictogram information are used, in association with information indicating the communication counterpart; and
in the pictogram selection processing, the CPU of the information processing apparatus acquires the communication counterpart to which to output the pictogram, and from among a plurality of items of the pictogram information that are associated with the keyword which is selected, selects one item of the pictogram information that corresponds to the pictogram which is used with highest frequency in a case of outputting to the communication counterpart that is acquired.

4. The information processing system according to claim 1, wherein, in the pictogram selection processing, the CPU of the information processing apparatus selects one item of the pictogram information that is set in advance from among a plurality of items of the pictogram information which are associated with the keyword that is selected.

5. The information processing system according to claim 1, wherein when selecting the keyword corresponding to the text that is based on the speech data from among the keywords which the pictogram correspondence information includes, the CPU of the information processing apparatus performs a selection in which an error in the speech recognition is reflected.

6. A vehicle-mounted device which is mounted in a vehicle, comprising:
- a microphone that picks up a speech sound;
- a memory that stores pictogram correspondence information in which keywords and pictogram information indicating a plurality of pictograms corresponding to the keywords are associated; and
- a CPU that performs speech recognition based on speech data that is generated based on the speech sound that is picked up by the microphone, and generates text that represents a speech sound based on a result of the speech recognition, wherein the CPU executes pictogram selection processing that, from among the keywords that the pictogram correspondence information includes, selects the keyword that corresponds to the text that represents the speech sound, and in accordance with a predetermined condition, selects one item of the pictogram information from among a plurality of items of the pictogram information that are associated with the keyword that is selected, the CPU determines whether or not the vehicle in which the vehicle is traveling, and if the vehicle is traveling, the CPU executes the pictogram selection processing, and if the vehicle is not traveling, the CPU executes processing that causes a user to select one of the pictograms from among the pictograms corresponding to a plurality of items of the pictogram information associated with the keyword that is selected, and selects one item of the pictogram information that corresponds to the one pictogram that is selected by the user.

\* \* \* \* \*